US 8,214,935 B2

(12) United States Patent
Colin

(10) Patent No.: US 8,214,935 B2
(45) Date of Patent: Jul. 10, 2012

(54) POP-UP FOUNTAINS

(75) Inventor: Raymundo Colin, Simi Valley, CA (US)

(73) Assignee: B & S Plastics, Inc., Oxnard, CA (US)

( * ) Notice: Subject to any disclaimer, the term of this patent is extended or adjusted under 35 U.S.C. 154(b) by 1313 days.

(21) Appl. No.: 11/701,033

(22) Filed: Jan. 31, 2007

(65) Prior Publication Data
US 2008/0180939 A1    Jul. 31, 2008

(51) Int. Cl.
E04H 4/12 (2006.01)
E04H 4/14 (2006.01)
E04H 4/00 (2006.01)
A47K 3/00 (2006.01)
A61H 33/00 (2006.01)
B05B 17/08 (2006.01)
B05B 15/10 (2006.01)
B05B 1/26 (2006.01)

(52) U.S. Cl. ............... 4/492; 4/496; 4/541.1; 4/541.3; 4/541.6; 239/17; 239/18; 239/203; 239/204; 239/505; 239/518

(58) Field of Classification Search ....... 4/488, 490–492, 4/496, 507, 508, 541.1, 541.3, 541.6, 678; 239/12, 16–18, 20, 200–204, 207, 461, 505–507, 239/518
See application file for complete search history.

(56) References Cited

U.S. PATENT DOCUMENTS

| 1,651,887 | A | 12/1927 | Hawes | |
|---|---|---|---|---|
| 3,292,861 | A | 12/1966 | Kawamura et al. | |
| 3,675,252 | A | 7/1972 | Ghiz | 4/492 |
| 4,202,499 | A | 5/1980 | Mathews | 239/206 |
| 4,316,579 | A | 2/1982 | Ray et al. | 239/123 |
| 4,347,979 | A | 9/1982 | Mathews | 239/206 |
| 4,617,615 | A | 10/1986 | Eychaner | 362/216 |
| 4,881,280 | A | 11/1989 | Lesikar | 4/507 |
| 4,971,250 | A | * 11/1990 | Hunter | 239/222.17 |
| 5,051,875 | A | 9/1991 | Johnson | 362/101 |
| 5,115,974 | A | 5/1992 | Tobias et al. | 239/23 |
| 5,122,936 | A | 6/1992 | Guthrie | 362/101 |
| 5,249,744 | A | 10/1993 | Ruthenberg | 239/23 |
| 5,271,561 | A | 12/1993 | Tobias et al. | 239/289 |
| 5,388,285 | A | 2/1995 | Belniak | 4/507 |
| 5,537,696 | A | 7/1996 | Chartier | 4/507 |
| 5,881,401 | A | 3/1999 | Saputo | 4/490 |
| 5,893,179 | A | 4/1999 | Johnson | 4/507 |

(Continued)

OTHER PUBLICATIONS

Waterway, 1999 Pool, Spa, Bath Buyer's Guide, Lights p. 31.

(Continued)

*Primary Examiner* — Darren W Gorman
(74) *Attorney, Agent, or Firm* — Koppel, Patrick, Heybl & Philpott

(57) ABSTRACT

Pop-up fountain embodiments are provided which successfully combine aesthetics, utility and ease of installation and are thus especially suited for installation into spas, hot tubs, pools and the like. Different embodiments include a fountain body and a fountain valve which is slidingly received in the body. The valve terminates in a cap which substantially fills an aperture of the body when the valve is in a quiescent position. Applied water pressure forces the valve into an energized position where the form of the valve directs water laterally in an aesthetically-pleasing pattern. The valve preferably includes a deflector which is arranged below the cap and configured to control and enhance the lateral deflection.

17 Claims, 5 Drawing Sheets

U.S. PATENT DOCUMENTS

| | | | |
|---|---|---|---|
| 6,138,924 A | 10/2000 | Hunter et al. | 239/204 |
| 6,170,094 B1 | 1/2001 | Weise et al. | 4/507 |
| 6,595,675 B2 | 7/2003 | Dongo | 362/562 |
| 6,644,561 B1 | 11/2003 | Daane | 239/18 |
| 7,182,477 B1 | 2/2007 | Hartz | 362/96 |

OTHER PUBLICATIONS

Catalog Pages, PEM 'M2' Jumping Jets, PEM Fountain Co., Richmond Hill, ON, Canada.

* cited by examiner

POP-UP FOUNTAINS

BACKGROUND OF THE INVENTION

1. Field of the invention

The present invention relates generally to water-control devices for spas, hot tubs, pools and the like.

2. Description of the Related Art

Spas, hot tubs, pools and the like are water-containment systems that are especially structured and designed to enhance the relaxation and enjoyment of the users of these systems. Although a variety of water-control devices (e.g., jets and waterfalls) have been developed to enhance the aesthetics and utility of these systems, the need yet exists for devices which successfully combine aesthetics, utility and ease of installation.

BRIEF SUMMARY OF THE INVENTION

Embodiments of the present invention are generally directed to water-control devices. The drawings and the following description provide an enabling disclosure and the appended claims particularly point out and distinctly claim disclosed subject matter and equivalents thereof.

DETAILED DESCRIPTION OF THE INVENTION

Figure 1:
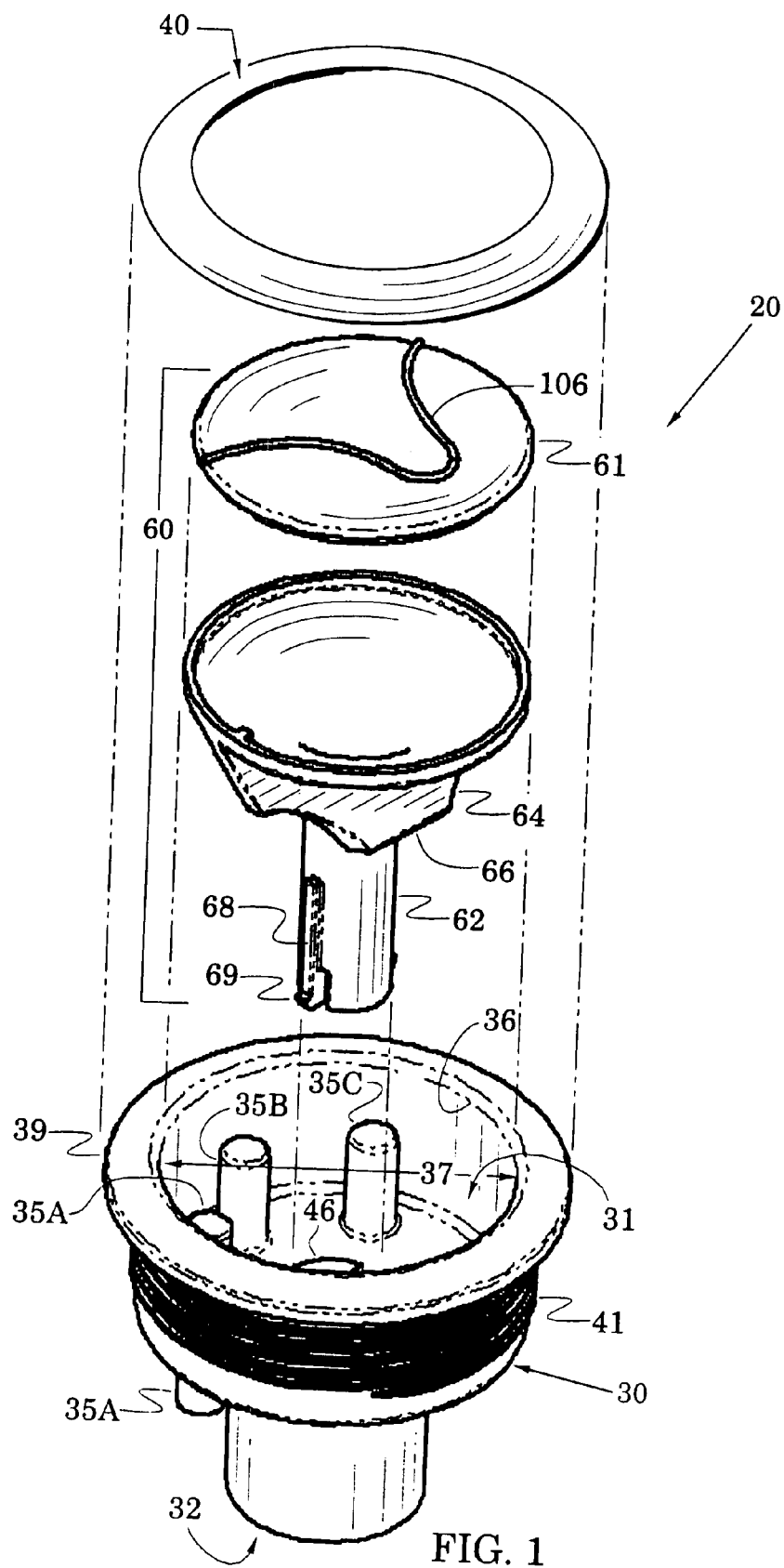
FIG. 1 is an exploded view of elements of a pop-up fountain embodiment of the present invention.

Pop-up fountain embodiments of the present invention are especially suited for installation into spas, hot tubs, pools and the like where they laterally cast out aesthetically pleasing patterns of water. These patterns can be altered in different fountain embodiments and they can be further aesthetically enhanced by directing light of various colors onto the patterns.

When not specifically directed to a respective drawing figure, the following description of fountain embodiments is directed to the structures shown in FIGS. 1-5B. With reference now to these figures, the fountain 20 includes a body 30 and a valve 60 that is slidingly received in the body. For aesthetic purposes, the fountain may also include a trim ring 40 that is carried over the upper surface of the body.

The body 30 is configured to define a chamber 31, an atrium 32, a web 33 that separates the atrium from the chamber, and a plurality of sockets 35 that pass through a portion of the web (and/or are attached to the web) and terminate in the chamber 31.

In one embodiment, the chamber has a cylindrical shape and terminates in a perimeter 36 which surrounds and defines an aperture 37. The body further defines a rim 39 which extends outward from the perimeter 36. On the outer surface below the rim, the body 30 is further configured to define threads 41.

In the embodiment shown, the atrium also has a cylindrical shape which is reduced from that of the chamber so that a floor 43 of the chamber is available outside of the atrium. The sockets 35 pass through this floor to terminate in the chamber and provide socket entrances 44 below the floor (as noted above, the sockets may also be configured so that they are supported by a side of the chamber). For orientation purposes, the sockets 35 are individually referenced as sockets 35A, 35B and 35C in some of the figures.

Figure 3:
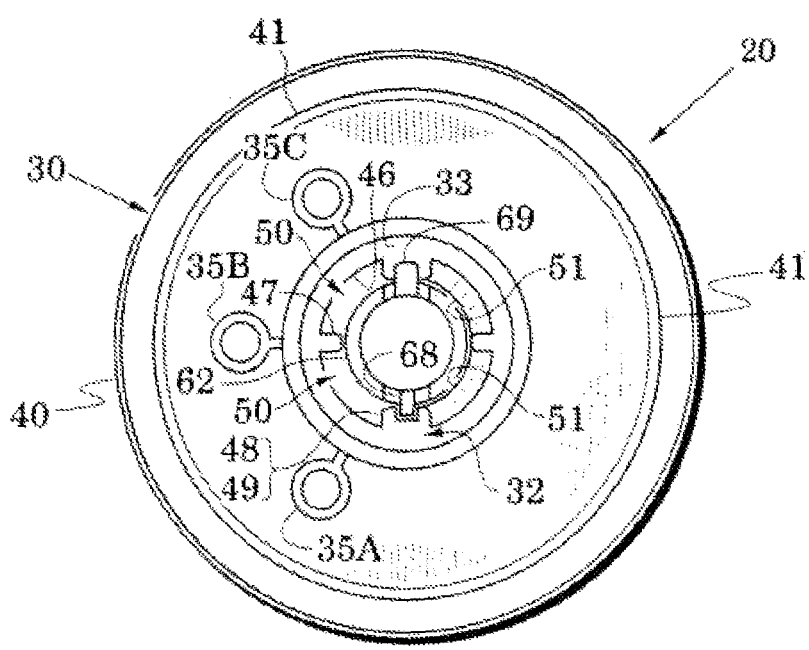
FIG. 3 is a bottom view of the embodiment of FIG. 2.

As perhaps best seen in FIG. 3, the web 33 defines a bore 46 that provides communication between the chamber and the atrium. A pair of oppositely-positioned ribs 47 extend inward from wall of the bore. Arranged between the ribs are a pair of bosses 48 that extend inward from the wall to define channels 49 which are configured to slidingly receive rails (described below) on the valve 60.

The valve 60 is configured to define a cap 61, a stem 62, and a deflector 64 and the valve, in response to water pressure, slides within the body from a quiescent position 60Q (shown only in FIG. 5A) to an energized position 60E (shown only in FIG. 5B). The cap is sized to substantially fill the aperture 37 in the quiescent position and is spaced from the perimeter in the energized position to define a slot 65 therebetween.

As shown, the deflector 64 at least partially encircles the stem 62 and terminates on each side of the stem at or near the cap 61. The deflector extends downward away from the cap to a deflector end 66 that is preferably spaced outward from the stem. Preferably, the deflector is further configured to define a curved surface to enhance deflection of water away from the stem and out through the slot 65. Also preferably, the stem 62 gradually swells in size as it approaches the cap to thereby smoothly transition into the cap and further enhance deflection of water through the slot 65.

As seen in FIGS. 1, 3, and 5A-6, the stem defines, near the stem end 67, a pair of oppositely-spaced rails 68 that terminate in tabs 69 which are resiliently coupled to the stem because the rails extend over cutouts 70 in the stem end 67.

Figure 2:
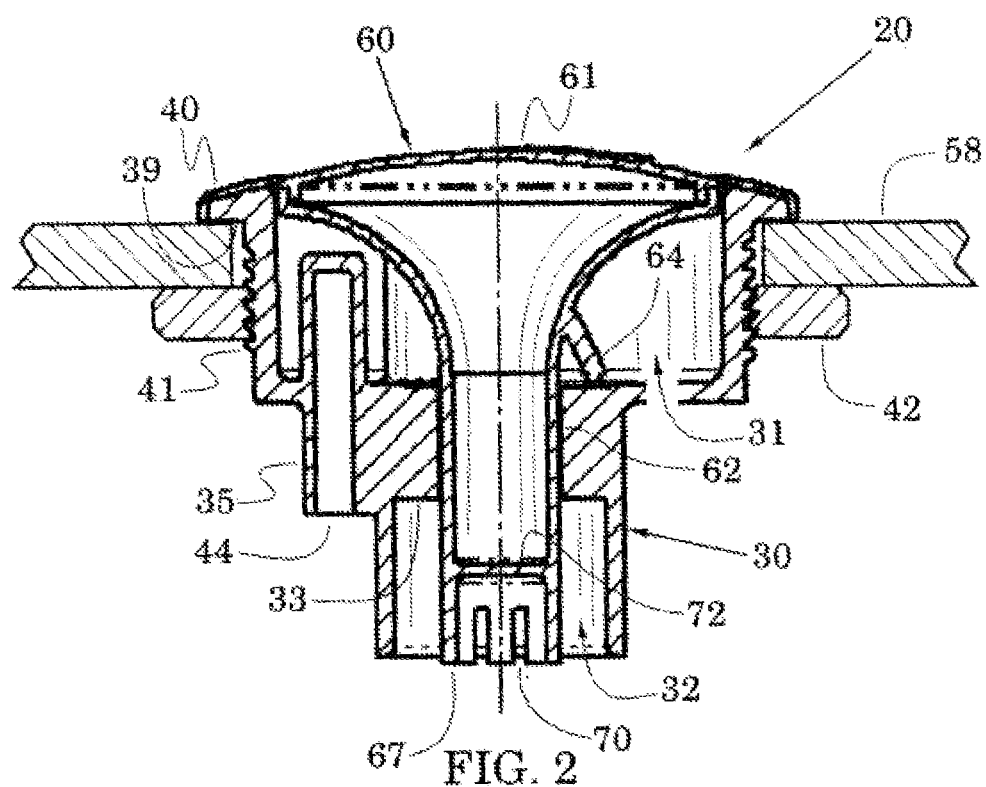
FIG. 2 is a sectional view through the embodiment of FIG. 1 when in its assembled configuration.
Figure 4:
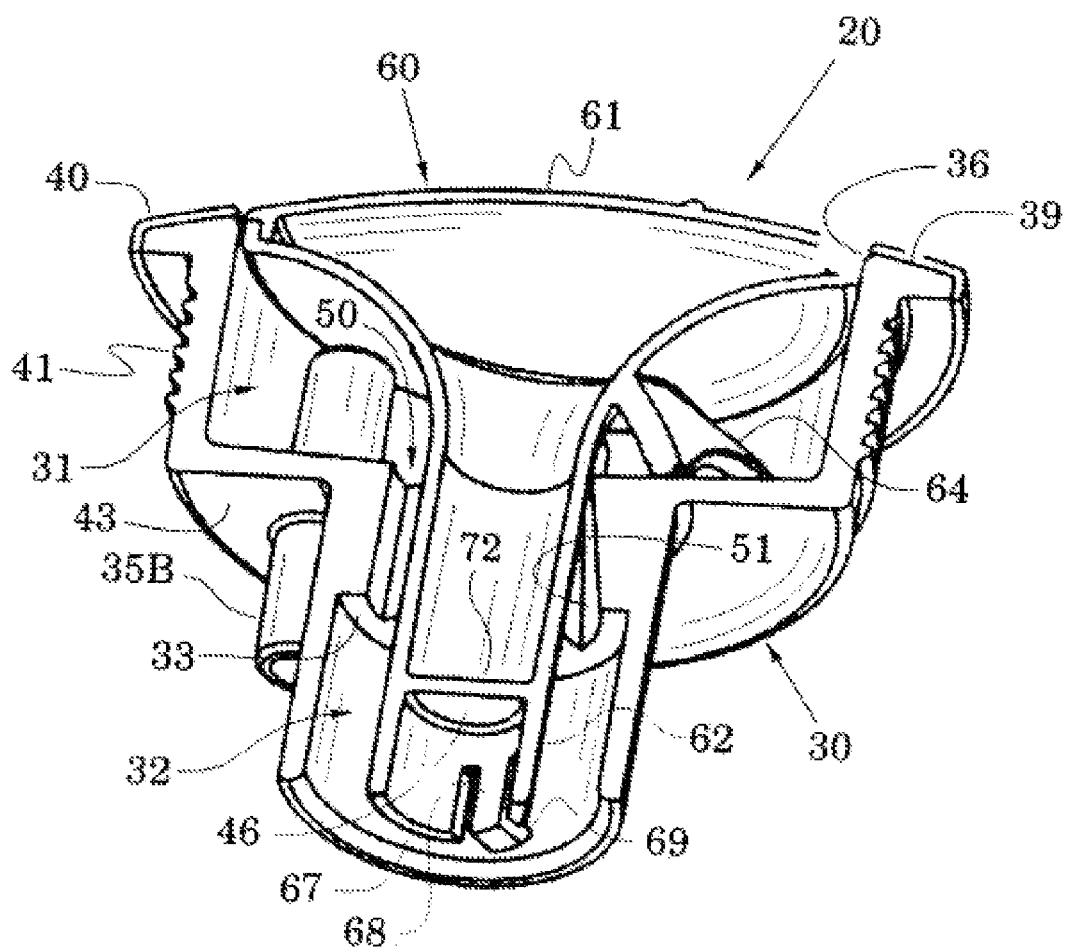
FIG. 4 is a sectioned perspective view of the embodiment of FIG. 2.
Figure 5:
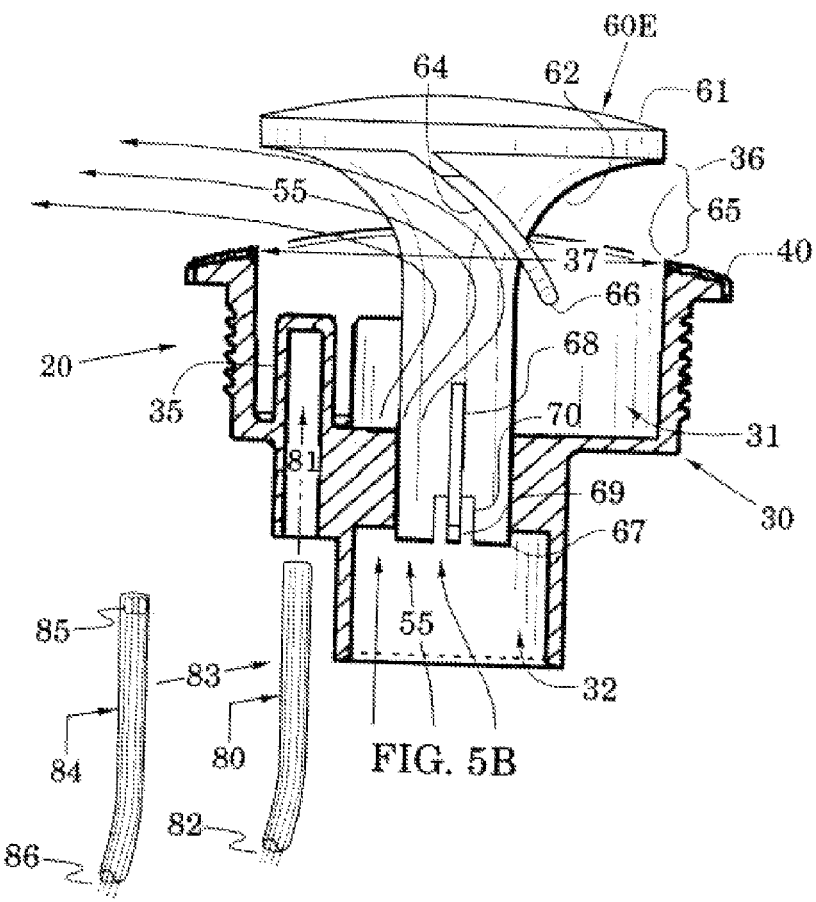
FIG. 5A is a view similar to FIG. 2 but with the diverter of FIG. 2 shown in full.
FIG. 5B is a view similar to FIG. 5A but with the diverter urged from the quiescent position of FIG. 5A to an energized position.

Although it may be fabricated in various manners, in one embodiment, the valve 60 may comprise (as best seen in FIG. 1) an upper cap 61 and a lower hollow stem 62. These portions may then be joined together (e.g., by a heat and pressure process when the upper and lower portions are fabricated from polymers) to form the valve 60. The fabricated valve 60 is thus hollow which enhances its rapid movement, in response to water pressure, between the quiescent and energized positions. As seen in FIGS. 2 and 4, the hollow interior of the valve 60 may be further defined by a transverse member 72 that is spaced inward from the stem end 67.

The valve 60 may be oriented into the body 30 as shown in FIG. 1 and, in particular, each of the tabs 69 of the valve is inserted into a respective one of the channels 49 in the bosses 48 of the body (best seen in FIG. 3). Because the cutouts 70 cause the tabs to be resiliently coupled to the stem 62, the tabs are urged inward as pressure is applied to force the valve down into the bore 46 of the body. After the tabs 69 pass through the channels 49, they resiliently spring outward so that the valve cannot be accidentally removed from the body. Once the valve has been inserted into the body, the tabs 69 now establish the energized position 60E (shown in FIG. 5B) when they abut the web 33 of the body.

Although not specifically shown in the figures, one of the channels 49 (in the bosses 48) may be configured with a width greater than that of the other channel and one of the ribs 68 may be configured with a width greater than that of the other rib. In a fountain embodiment, this configuration insures that the valve 60 can only be inserted into the body in an orientation in which the deflector 64 is facing towards the sockets 35 that extend upward through the floor 43 of the chamber 31.

The web 33 that separates the atrium 32 and the chamber 31 was previously introduced as well as the bore 46 through the web which provides communication between the chamber and the atrium. As best seen in FIG. 3, the stem 62 is smaller than the bore 46 so that they, together with the bosses 48 and one of the ribs 47, form a pair of passages 50 that communicate between the atrium and the chamber. It is apparent from FIG. 3 that these passages are on the same side of the chamber as the sockets 35 and are on a side of the stem 62 that is opposite the side that is encircled by the deflector 64.

It is noted that the stem 62, bore 46, bosses 48 and the other of the ribs 47 could form a matching pair of passages between the atrium and the chamber. In a fountain embodiment shown in FIG. 3, however, these additional passages are preferably closed off by a pair of slanted bore walls 51 that slant inward towards the stem as they proceed from the atrium side of the bore to the chamber side of the bore. At the chamber side, therefore, the bore is closely spaced from the stem everywhere except in the passages 50. One of these passages 50 is also visible in FIG. 4 along with one of the slanted walls 51. Because of the slanted walls 51, the flow of water from the atrium 32 to the chamber 31 is substantially restricted to the pair of passages 50 that are visible in FIG. 3. This water flow 55 is clearly shown in FIG. 5B.

The fountain embodiment 20 can be easily installed in water systems such as spas, hot tubs, pools and the like. For example, FIG. 2 shows the embodiment 20 inserted through a hole in a panel 58 so that the underside of the rim 39 abuts the panel. A nut 42 is then threaded onto the threads 41 to secure the embodiment to the panel. Although not specifically shown, the panel 58 can be thicker and threaded to receive the threads 41. The embodiment can then be rotated into the threads 41 which obviates the need for the nut and/or access from the under side of the panel.

To describe operation of the fountain embodiment 20, it is initially assumed there is no water pressure applied to the atrium 32 of the fountain. In the absence of this pressure, the valve sinks into the body 30 until the deflector end 66 abuts one side of the web 33 (and/or the bottom of the chamber 31) as shown in FIG. 5A. The quiescent position 60Q of the piston is thus established. To emphasize this function, the deflector end 66 can also be considered to be a stop 66 which stops the piston when it abuts the web. The piston is configured so that, in this position, the cap 61 is substantially aligned with the perimeter 36 of the chamber 31 and substantially fills the aperture 37.

In response to application of water pressure, the piston rises until the tabs 69 abut the other side of the web 33 to establish the energized position 60E of the piston which is shown in FIG. 5B. In further response to the pressure, water flow 55 passes through the passages 50 and as it subsequently passes through the aperture 37, it is deflected off of the deflector 64 and the outward swell of the stem 62 to thereby pass out through the slot 65 between the cap and the perimeter 36.

The ribs 47 in the web 33 help to guide and position the stem 62 as it passes through the web. It is noted that, in a different fountain embodiment, the ribs could be defined on the stem rather than the web. As the stem passes through the web, each of the rails 68 passes through a respective one of the channels 49 that are defined by the bosses 48 and these structures also assist in the guiding and positioning of the stem 62.

It is also noted that, in a different embodiment, the rails and the bosses could respectively be defined by the web and the stem.

Because of the configuration of the deflector 64 and the upper portion of the stem 62, the water flow 55 assumes an attractive arched fan-shaped pattern as it issues laterally from the general orientation of the stem. This pattern can be aesthetically altered into a large number of different patterns by altering the exact shape of the deflector and the stem.

Different patterns can be obtained, for example, by configuring the shape of the deflector and the stem as they are seen in FIGS. 5A and 5B to assume various curves. The pattern can also be varied by altering the shape of the deflector as they are seen when looking down on the top of the cap 61. For example, the points where the deflector joins the cap can be moved nearer to or further from the sockets 35. The deflector end (stop) 66 can also be moved to be further or less spaced from the stem.

The appearance of the water flow 55 can also be aesthetically altered by directing light of various colors against it as it issues through the slot 65. This alteration is realized by inserting (as indicated by insertion arrow 81) a respective light-emitting member in the form of an optical fiber cable 80 into each of the sockets 35 until the cable abuts the socket end Each of these cables generally comprises a bundle of optical fibers 82 and conducts applied light along the cable so that it issues out of the sockets and illuminates the water flow 55 as it passes overhead. The lighted appearance can be aesthetically altered by varying the color of the light that issues from the various sockets.

In another fountain embodiment, the optical fiber cables 80 can be replaced with different light-emitting members (as indicated by replacement arrow 83). For example, they may be replaced with light-emitting diodes (LEDs) 85 that are packaged into a light cable 84. The LEDs and their associated wires 86 can be bonded into a flexible cable similar to the optical fiber cables. Again, various color effects can be realized by selecting among LEDs of different colors (e.g., red, green and blue).

Figure 6:
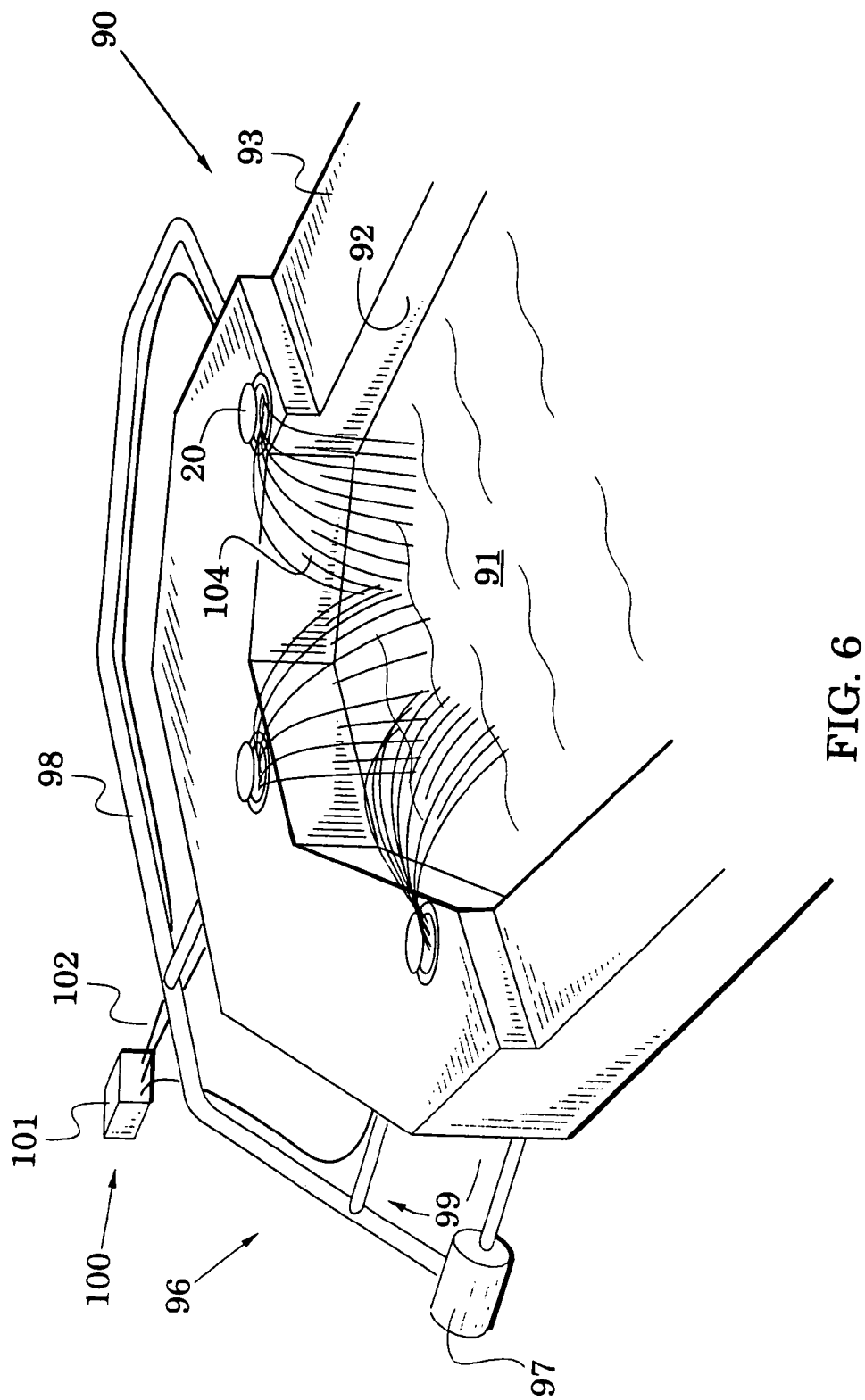
FIG. 6 is a perspective view of a spa that includes a plurality of the embodiment illustrated in FIGS. 1-5B.

Fountain embodiments of the present invention can be usefully installed in various ways into various water-containment systems such as spas, hot tubs, and pools. For example, FIG. 6 illustrates a system 90 which receives water 91 into a shell 92 that has a surrounding coping 93. A plurality of fountain embodiments 20 such as those shown in FIGS. 1-5B are installed in the coping and spaced along the coping.

A pump system 96 includes a pump 97 and pipes 98 that take water from the shell 92 and circulate it back with pressure into the fountains 96 (as indicated by circulation arrow 99). A lighting system 100 also provides light through a distribution box 101 and light cables 102 which are inserted into the sockets (35A, 35B and 35C in FIG. 1) of the fountains 20.

When the pump system is turned on the pistons in the fountains rise from their quiescent positions (60Q in FIG. 5A) to their energized positions (60E in FIG. 5B) and water issues laterally in graceful patterns 104 into the water 91. Fountain systems such as that shown in FIG. 6 may be structured to obtain aesthetically pleasing patterns and these patterns can be significantly enhanced when the light provided by the light system 100 is also applied to the fountains 20.

To facilitate installation of the fountains 20 into the system 90 of FIG. 6, the upper surface of the cap 61 of the valve 60 may carry a design that indicates the direction of the water flow 55 in FIG. 5B. Because it is on the most visible portion of the fountain, this design may also be arranged (e.g., as in the design 106 of FIG. 1) to enhance the aesthetic appearance of the cap while also indicating the direction of the water flow. The cap is preferably formed from a polymer that is sufficiently strong and sufficiently thick to easily support users of the system 90 as they walk along the coping 93.

Although they may take other shapes in different fountain embodiments, the chamber 31 and the atrium 32 are cylindrical in shape in the embodiment of FIGS. 1-5B.

Although they may be formed from various materials in various fountain embodiments, the body 30 and valve 50 are advantageously formed in other embodiments, from polymers. Although both the body and the valve may be formed of opaque polymers (e.g., acrylonitrile butadiene styrene (ABS) and polyvinyl chloride (PVC)), the body is preferably formed of translucent polymers (e.g., acrylic and polycarbonate) to facilitate use of the light-emitting members that are inserted into the sockets in FIG. 5B.

The trim ring 40 may be made from various materials (e.g., metal, polymer) and in various colors to thereby enhance the aesthetic appearance of fountain embodiments when they are used in association with various spas, hot tubs, pools and the like as shown, for example, in FIG. 6.

It is noted that the term spa is used herein as a generic term which generally refers to any water-containment systems (e.g., spas, hot tubs, pools and the like) that are primarily directed to the relaxation and enjoyment of the users of these structures.

The embodiments of the invention described herein are exemplary and numerous modifications, variations and rearrangements can be readily envisioned to achieve substantially equivalent results, all of which are intended to be embraced within the spirit and scope of the appended claims.

I claim:

1. A pop-up fountain, comprising:
a body which defines a chamber that terminates in an aperture bounded by a perimeter; and
a valve slidingly received in said body to be urged by water pressure from a quiescent position to an energized position wherein:
said valve terminates in a cap which substantially fills said aperture in said quiescent position and is spaced from said perimeter in said energized position to thereby define a slot therebetween; and
said valve defines a deflector which is arranged below said cap and configured to deflect water through said slot when said valve is in said energized position;
said body defines an atrium for entrance of water and a web that separates said atrium from said chamber;
said valve defines a stem that is slidingly received through said web; and
at least one of said web and said stem defines at least a portion of at least one passage that communicates between said atrium and said chamber to facilitate flow of water against said deflector when said valve is in said energized position.

2. The fountain of claim 1, wherein said stem transitions into said cap and wherein said deflector at least partially encircles said stem.

3. The fountain of claim 2, wherein said deflector extends away from said cap and terminates at a deflector end, said deflector end being spaced outward from said stem.

4. The fountain of claim 2, wherein said deflector has a curved surface to enhance deflection of water through said slot.

5. The fountain of claim 4, wherein said stem swells to meet said cap to further enhance deflection of water through said slot.

6. The fountain of claim 1, wherein said deflector defines a stop that abuts said web to thereby establish said quiescent position.

7. The fountain of claim 1, wherein said stem defines a tab that abuts said web to thereby establish said energized position.

8. The fountain of claim 1, wherein one of said stem and said web defines a rib that guides said stem as said valve transitions between said quiescent and energized positions.

9. The fountain of claim 8, wherein said rib defines a portion of said passage.

10. The fountain of claim 1, wherein one of said stem and said web defines a channel and the other of said stem and said web defines a rail that slides through said channel as said valve transitions between said quiescent and energized positions.

11. A pop-up fountain, comprising:
a body which defines a chamber that terminates in an aperture bounded by a perimeter; and
a valve slidingly received in said body to be urged by water pressure from a quiescent position to an energized position wherein:
said valve terminates in a cap which substantially fills said aperture in said quiescent position and is spaced from said perimeter in said energized position to thereby define a slot therebetween; and
said valve defines a deflector which is arranged below said cap and configured to deflect water through said slot when said valve is in said energized position, said deflector comprising a deflector end opposite said cap, said deflector end being spaced outward from said valve;
wherein said body comprises a translucent polymer and defines at least one socket that terminates in said chamber and further including a light-emitting member received in said socket to illuminate water that issues through said slot when said valve is in said energized position.

12. The fountain of claim 11, wherein said light-emitting member comprises a bundle of optical fibers.

13. The fountain of claim 1, wherein said light-emitting member comprises at least one light-emitting diode.

14. A pop-up fountain, comprising:
a body that defines:
a chamber which terminates in an aperture bounded by a perimeter;
an atrium for entrance of water; and
a web that separates said atrium from said chamber; and
a valve that defines a stem which is slidingly received in said body so that said valve is urged by water pressure from a quiescent position to an energized position wherein:
said valve terminates in a cap which substantially fills said aperture in said quiescent position and is spaced from said perimeter in said energized position to thereby define a slot therebetween; and
said valve defines a deflector which is arranged below said cap to deflect water through said slot when said valve is in said energized position;
wherein said deflector partially encircles said stem and has a curved surface to enhance deflection of water through said slot and wherein said stem swells to meet said cap to further enhance deflection of water through said slot,
wherein said body comprises a translucent polymer and defines at least one socket that terminates in said chamber and further including a light-emitting member received in said socket to illuminate water that issues through said slot when said valve is in said energized position.

15. A pop-up fountain, comprising:
a body that defines:
  a chamber which terminates in an aperture bounded by a perimeter;
  an atrium for entrance of water; and
  a web that separates said atrium from said chamber; and
a valve that defines a stem which is slidingly received in said body so that said valve is urged by water pressure from a quiescent position to an energized position wherein:
  said valve terminates in a cap which substantially fills said aperture in said quiescent position and is spaced from said perimeter in said energized position to thereby define a slot therebetween; and
  said valve defines a deflector which is arranged below said cap to deflect water through said slot when said valve is in said energized position;
wherein said deflector partially encircles said stem and has a curved surface to enhance deflection of water through said slot and wherein said stem swells to meet said cap to further enhance deflection of water through said slot,
wherein said stem defines a tab that abuts said web to thereby establish said energized position and wherein said deflector defines a stop that abuts said web to thereby establish said quiescent position.

16. A spa, comprising:
a shell configured to hold a pool of water and to form a coping that at least partially surrounds said pool;
at least one fountain carried in said coping and having:
  a body which defines a chamber that terminates in an aperture bounded by a perimeter; and
  a valve slidingly received in said body to be urged by water pressure from a quiescent position to an energized position wherein:
  said valve terminates in a cap which substantially fills said aperture in said quiescent position and is spaced from said perimeter in said energized position to thereby define a slot therebetween; and
  said valve defines a deflector which is arranged below said cap to deflect water through said slot and into said pool when said valve is in said energized position; and
a pump system that circulates water from said pool to said chamber.

17. The spa of claim 16, wherein:
said body defines an atrium for entrance of water and a web that separates said atrium from said chamber;
said valve defines a stem that is slidingly received through said web; and
at least one of said web and said stem define at least a portion of at least one passage that communicates between said atrium and said chamber to facilitate flow of water against said deflector when said valve is in said energized position.

* * * * *